United States Patent
Caulkins et al.

(10) Patent No.: US 10,753,252 B2
(45) Date of Patent: Aug. 25, 2020

(54) THERMALLY ISOLATED REDUCTANT DOSING UNIT WITH HERMETIC SEAL

(71) Applicant: Continental Automotive Systems, Inc., Auburn Hills, MI (US)

(72) Inventors: Christopher Michael Caulkins, Virginia Beach, VA (US); Keith Aaron Shaw, Yorktown, VA (US)

(73) Assignee: Vitesco Technologies USA, LLC., Auburn Hills, MI (US)

( * ) Notice: Subject to any disclaimer, the term of this patent is extended or adjusted under 35 U.S.C. 154(b) by 7 days.

(21) Appl. No.: 16/007,746

(22) Filed: Jun. 13, 2018

(65) Prior Publication Data

US 2018/0363530 A1 Dec. 20, 2018

Related U.S. Application Data

(60) Provisional application No. 62/519,840, filed on Jun. 14, 2017, provisional application No. 62/521,363, filed on Jun. 16, 2017.

(51) Int. Cl.
*F01N 3/20* (2006.01)
*F01N 13/14* (2010.01)
(Continued)

(52) U.S. Cl.
CPC ........... *F01N 3/2066* (2013.01); *B01D 53/90* (2013.01); *F01N 13/14* (2013.01);
(Continued)

(58) Field of Classification Search
CPC combination set(s) only.
See application file for complete search history.

(56) References Cited

U.S. PATENT DOCUMENTS 6,279,603 B1 * 8/2001 Czarnik ............. B01D 53/8625
  123/472
8,225,602 B2 * 7/2012 Cavanagh ............. F01N 3/2066
  60/295
(Continued)

FOREIGN PATENT DOCUMENTS

DE   102009027713 A1   1/2011
DE   102013007380 A1   10/2014
(Continued)

OTHER PUBLICATIONS

International Search Report and the Written Opinion of the International Searching Authority dated Aug. 20, 2018 for corresponding PCT Application No. PCT/US2018/037588.

*Primary Examiner* — Binh Q Tran (57) ABSTRACT

A reductant dosing unit is disclosed, including a fluid injector having a fluid inlet and a fluid outlet. A flange is disposed proximal to the fluid outlet of the fluid injector and configured to secure to a boss associated with an exhaust path of an internal combustion engine. The flange has a largely flat body portion with a through-bore in fluid communication with the fluid outlet of the fluid injector. The flange further includes an extension which extends from the body portion toward the fluid injector and which is connected to thereto. A thermal isolator is disposed between the fluid outlet of the fluid injector and the flange. The connection between the extension of the flange and the fluid injector includes a hermetic seal, preventing exhaust gases in the exhaust path from passing between the flange extension and the fluid injector. The thermal isolator is only used as a support and thermal isolator.

19 Claims, 10 Drawing Sheets

(51) Int. Cl.
*F01N 13/18* (2010.01)
*B01D 53/90* (2006.01)
*B01D 53/94* (2006.01)

(52) U.S. Cl.
CPC ..... *F01N 13/1827* (2013.01); *F01N 13/1855* (2013.01); *B01D 53/9418* (2013.01); *F01N 2260/02* (2013.01); *F01N 2260/024* (2013.01); *F01N 2260/20* (2013.01); *F01N 2310/00* (2013.01); *F01N 2450/24* (2013.01); *F01N 2510/02* (2013.01); *F01N 2610/02* (2013.01); *F01N 2610/11* (2013.01); *F01N 2610/1453* (2013.01)

(56) References Cited

U.S. PATENT DOCUMENTS

| | | |
|---|---|---|
| 8,495,986 B2 | 7/2013 | Reba |
| 9,745,880 B2 * | 8/2017 | Haeberer ............... F01N 3/2066 |
| 2006/0107655 A1 * | 5/2006 | Hanitzsch ............. F01N 3/2066 60/286 |
| 2008/0236147 A1 * | 10/2008 | Van Vuuren .......... F01N 3/2066 60/295 |
| 2010/0192913 A1 * | 8/2010 | Keidel ...................... F01N 3/36 123/470 |
| 2015/0090724 A1 * | 4/2015 | Gross ................... F01N 3/2066 220/562 |
| 2015/0093302 A1 | 4/2015 | Pohl et al. |
| 2016/0305298 A1 | 10/2016 | Murst et al. |
| 2016/0369679 A1 | 12/2016 | Haeberer |

FOREIGN PATENT DOCUMENTS

| | | |
|---|---|---|
| EP | 2664760 A1 | 11/2013 |
| EP | 3011154 A1 | 4/2016 |

\* cited by examiner

THERMALLY ISOLATED REDUCTANT DOSING UNIT WITH HERMETIC SEAL

CROSS REFERENCE TO RELATED APPLICATIONS

The present application claims priority to and the benefit of U.S. patent application 62/519,840, filed Jun. 14, 2017, and titled "Thermally Isolated Reductant Dosing Unit with Hermetic Seal"; and U.S. patent application 62/521,363, filed Jun. 16, 2017, also titled "Thermally Isolated Reductant Dosing Unit with Hermetic Seal." The content of both applications is incorporated by reference herein in their entirety.

FIELD OF INVENTION

The present invention generally relates to a reductant dosing unit (RDU) and particularly to an RDU that provides thermal isolation and hermetic sealing.

BACKGROUND

The advent of a new round of stringent emissions legislation in Europe and North America is driving the implementation of new exhaust after-treatment systems, particularly for lean-burn technologies such as compression-ignition (diesel) engines, and stratified-charge spark-ignited engines (usually with direct injection) that are operating under lean and ultra-lean conditions. Lean-burn engines exhibit high levels of nitrogen oxide (NOx) emissions that are difficult to treat in oxygen-rich exhaust environments characteristic of lean-burn combustion. Exhaust after-treatment technologies are currently being developed that will treat NOx under these conditions. One of these technologies comprises a catalyst that facilitates the reactions of ammonia ($NH_3$) with the exhaust nitrogen oxides (NOx) to produce nitrogen ($N_2$) and water ($H_2O$). This technology is referred to as Selective Catalytic Reduction (SCR).

Diesel exhaust fluid is known to "creep" through small gaps due to its capillary action. This requires near hermetic leak rates of gaskets on RDU's.

Mica has been used to both provide a thermal barrier to the fluid injector and facilitate a near hermetic seal with the RDU. This use of mica needs a significant force to provide a near hermetic seal. This force can be applied by either mounting bolts or a V-clamp. Prior attempts to seal with mica required large bolts or V-clamp to achieve a proper sealing force. This is neither cost effective nor packaging friendly in a tight engine bay. Other methods, such as a sealing bead, concentrate the force applied by the bolts over a smaller area but must be machined into the mounting flange or boss. This adds complexity and cost. Another method of providing a near hermetic seal with mica is complex multilayer gaskets. This again adds cost and complexity.

Another known RDU design uses an air gap as the isolator and a metal-to-metal crimp on the RDU to provide the seal. This leads to poor packaging and the air gap could potentially become clogged with urea crystals.

Yet another known RDU design uses seals on the mica by machining a sealing bead into the hub component. This concentrates the stress sufficiently to get a seal. This leads to large forces applied to the housings and thus thick robust housings must be used.

Still another known RDU design uses a multi-layer steel-mica-steel gasket with built in stress concentrators. This makes the mica gasket a costly and complex assembly.

SUMMARY

Example embodiments allow the use of an isolator, such as mica, to thermally isolate the injector from the engine's exhaust pipe without the cost and complexity of making the mica serve as a seal. A laser weld joins the housings and seals exhaust gases. As a result, the mica is only used as a support and thermal isolator.

The example embodiments do not use the isolator, mica or other material, as the exhaust gas seal. The isolator is used only for mechanical support and thermal isolation. The laser welded housing provides the required exhaust hermiticity.

Other materials could be used as the isolator since it is not required to provide a seal, thus possibly reducing cost. Ceramics, vermiculite, Isoplan, air, or other low thermally conductive material could be used as the isolator.

According to an example embodiment, an RDU includes: a fluid injector having a fluid inlet for receiving a reductant and a fluid outlet for discharging the reductant; a flange disposed proximal to the fluid outlet of the fluid injector and configured to secure to a boss associated with an exhaust path of an internal combustion engine, the flange having a largely flat body portion with a through-bore in fluid communication with the fluid outlet of the fluid injector, and an extension which extends from the body portion toward the fluid injector and which is connected to thereto. A thermal isolator member is disposed between the fluid outlet of the fluid injector and the flange. In an example embodiment, the connection between the extension of the flange and the fluid injector is a hermetic seal.

In one aspect, the hermetic seal connection is a laser weld connection.

In another aspect, the flange is secured to the boss, and the hermetic seal connection prevents exhaust gas from the exhaust path from passing between the flange and the fluid injector.

In still another aspect, the RDU is a liquid cooled RDU having a coolant inlet, a coolant outlet and a coolant jacket at least partly defining a region that is in fluid communication with the coolant inlet and the coolant outlet. The coolant jacket includes a coolant jacket extension, wherein a radially outer surface of the coolant jacket extension forms the hermetic seal connection with the extension of the flange.

In another aspect, the thermal isolator member is constructed from mica. The thermal isolator member may have an annular shape and surround an upstream opening of the through-bore of the flange, relative to a direction of reductant flow through the RDU. In one example embodiment, the thermal isolator radially extends to an inner surface of the extension of the flange. In another example embodiment, the thermal isolator extends radially outwardly so as to be spaced from an inner surface of the extension of the flange.

BRIEF DESCRIPTION OF THE DRAWINGS

Aspects of the invention will be explained in detail below with reference to an exemplary embodiment in conjunction with the drawings, in which.

DETAILED DESCRIPTION

The following description of the preferred embodiment(s) is merely exemplary in nature and is in no way intended to limit the invention, its application, or uses.

Figure 1:
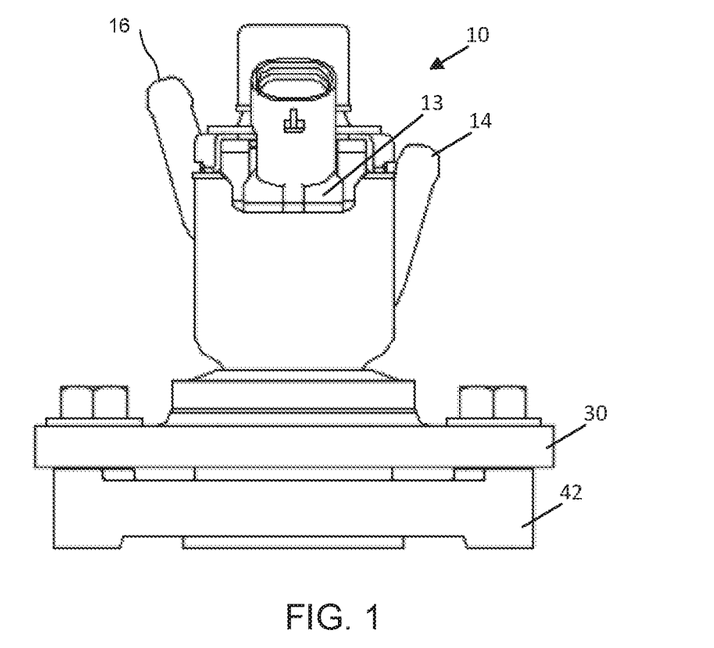
FIG. 1 is a side view of an RDU coupled to an exhaust boss of a vehicle's exhaust system, according to an example embodiment.
Figure 2:
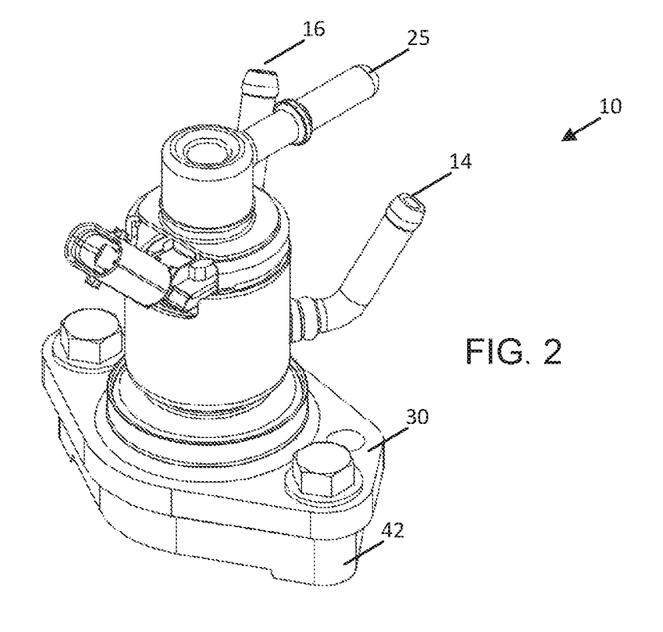
FIG. 2 is another side view of the RDU and exhaust boss of FIG. 1.
Figure 3:
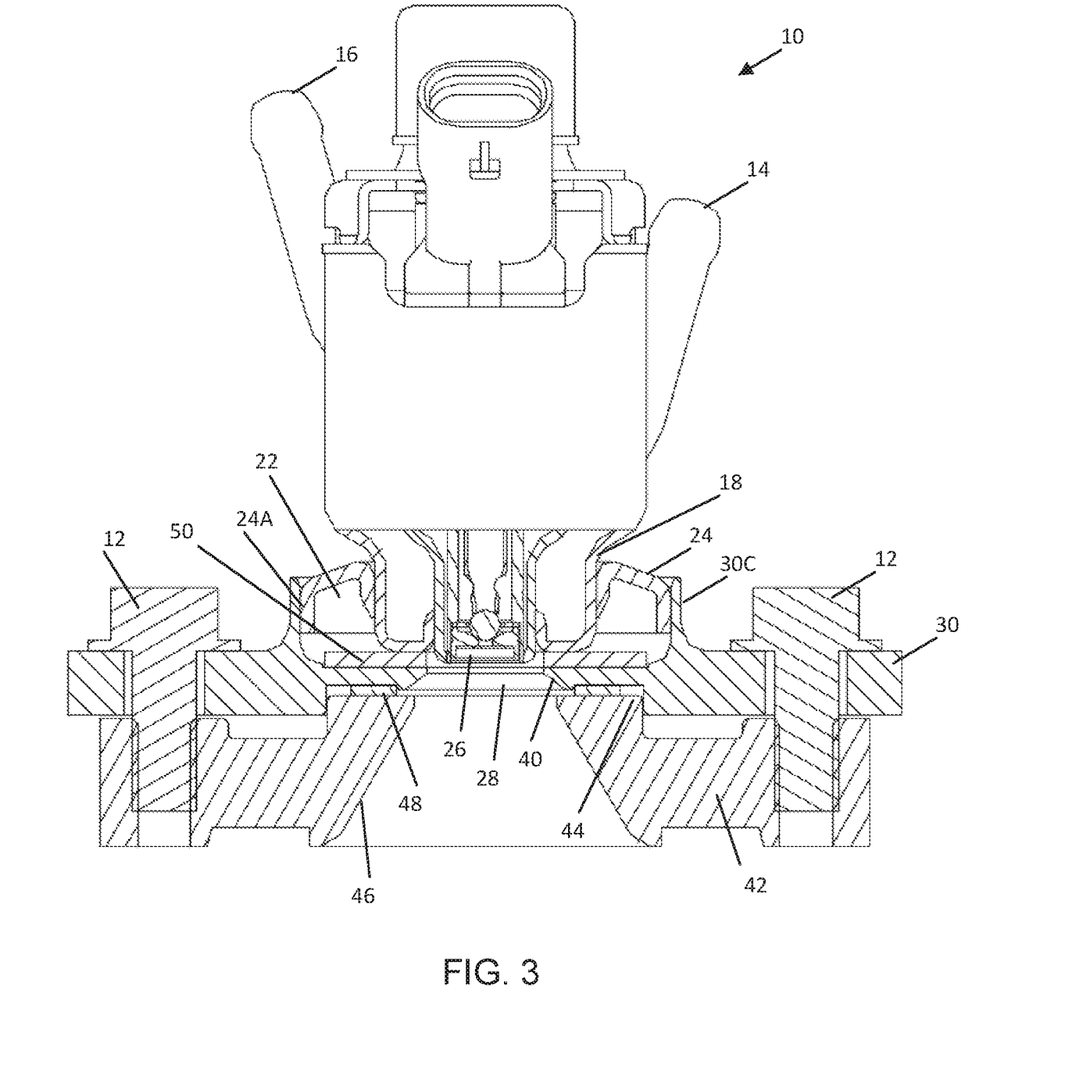
FIG. 3 is cross-sectional side view of the RDU and exhaust boss of FIG. 1.

With reference to FIGS. 1-3, an RDU is shown, generally indicated at 10, in accordance with an embodiment. The RDU 10 may be employed in a system of the type disclosed in U.S. Pat. No. 8,024,922, the contents of which are hereby incorporated by reference into this specification.

The RDU 10 includes a solenoid fluid injector, generally indicated at 13, that provides a metering function of fluid, such as a reductant, and provides the spray preparation of the fluid into the exhaust path of an internal combustion engine in a dosing application. Thus, the fluid injector 13 is constructed and arranged to be associated with an exhaust gas flow path upstream of an SCR catalytic converter. The fluid injector 13 may be an electrically operated, solenoid fluid injector such as the type disclosed in U.S. Pat. No. 6,685,112, the content of which is hereby incorporated by reference into this specification. Thus, the injector 13 has a coil and a movable armature (not shown) for controlling the passage of fluid (reductant) through the injector.

The fluid injector 13 includes an inlet 25 which is in communication with a source of urea solution (not shown) that is fed to the injector 13 to be injected from an injector outlet 26 of the injector 13. RDU 10 includes a flange 30 that is connected to an exhaust boss 42 of the engine's exhaust stream. This connection provides a fluid flow path from injector outlet 26, through flange 30 and boss 24, and into the engine's exhaust stream.

In an example embodiment, RDU 10 is a liquid cooled RDU. In other words, RDU 10 allows for a liquid coolant to flow around and contact an outer surface of injector 13 so as to cool the RDU. Accordingly, RDU 10 includes a coolant inlet port 14 for coupling to a coolant reservoir (not shown) and receiving coolant therefrom, and a coolant outlet port 16 coupling to the coolant reservoir and exiting coolant thereto. RDU 10 further includes a coolant jacket 18 (FIG. 3) which at least partly defines a volume 25 that is in fluid communication with coolant inlet port 14 and coolant outlet port 16, through which coolant flows for cooling fluid injector 13. As shown in FIG. 3, coolant jacket 18 includes inner and outer walls which at least partly define volume 25. Coolant jacket 18 further includes a jacket extension 24 which is coupled to the outer wall of coolant jacket 18.

Flange 30 of RDU 10 includes an internal surface structure, generally indicated at 40, that defines the flange outlet 28 which delivers fluid (reductant) into exhaust boss 42 of an exhaust flow path of an internal combustion engine. Thus, as shown in FIG. 3, the flange 30 is coupled to an end 44 of the exhaust boss 42, with the flange outlet 28 communicating with a bore 46 of the boss 42. In the embodiment depicted in FIG. 3, a gasket 48 is disposed between the downstream end of flange 30 and the upstream end of exhaust boss 42. Gasket 48 serves to provide a sealing engagement between flange outlet 28 and bore 46 of boss 42. The bore 46 is in fluid communication with the exhaust flow path of the engine. The flange 30 provides a mechanical support that mounts the fluid injector 13 so that the downstream tip thereof is placed in a remote position with respect to the hot exhaust gases of the engine.

With continued reference to FIG. 3, RDU 10 includes a thermal isolator 50 disposed between flange 30 and the downstream end of RDU 10 and/or fluid injector 13. Thermal isolator 50 is thermally resistant and thus provides a thermal barrier between fluid injector 13 and flange 30 and/or exhaust boss 42. As a result, thermal isolator 50 serves to protect fluid injector 13 of RDU 10 from the high temperatures in the engine's exhaust. In an example embodiment, thermal isolator 50 has an annular shape. The dimensions of thermal isolator 50 may vary depending upon the particular RDU 10, flange 30 and boss 42. In one embodiment, the thickness of thermal isolator 50 may be between 1.0 mm and 3.0 mm, such as 1.5 mm. The diameter of thermal isolator 50 may allow for thermal isolator 50 to extend nearly entirely to the inner walls which contain thermal isolator 50, or may extend less than that.

As shown in FIGS. 1-4 and in accordance with an example embodiment, flange 30 secures to exhaust boss 42 with bolts 12. Bolts 12 extend through bores defined through flange 30 and threadingly engage with threaded openings in exhaust boss 42. The 2-bolt flange 30 allows for ease of packaging in environments that have limited horizontal access to RDU 10.

Figure 5:
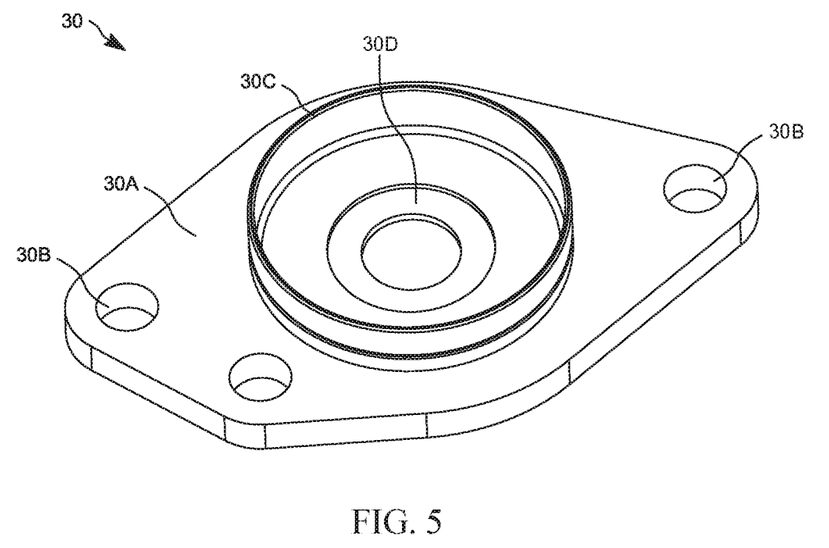
FIG. 5 is a top perspective view of a flange of the RDU of FIGS. 1-4 according to an example embodiment.
Figure 6:
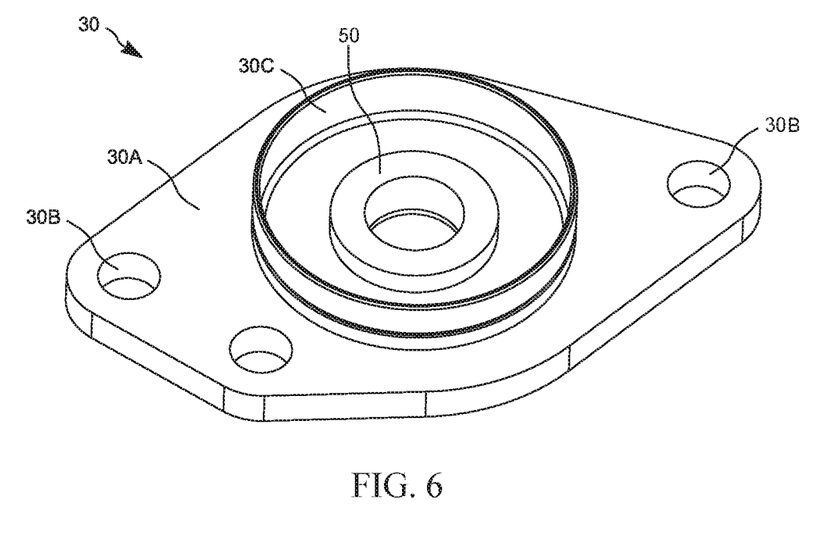
FIG. 6 is a top perspective view of the flange of FIG. 5 with a thermal isolator disposed thereon.
Figure 7:
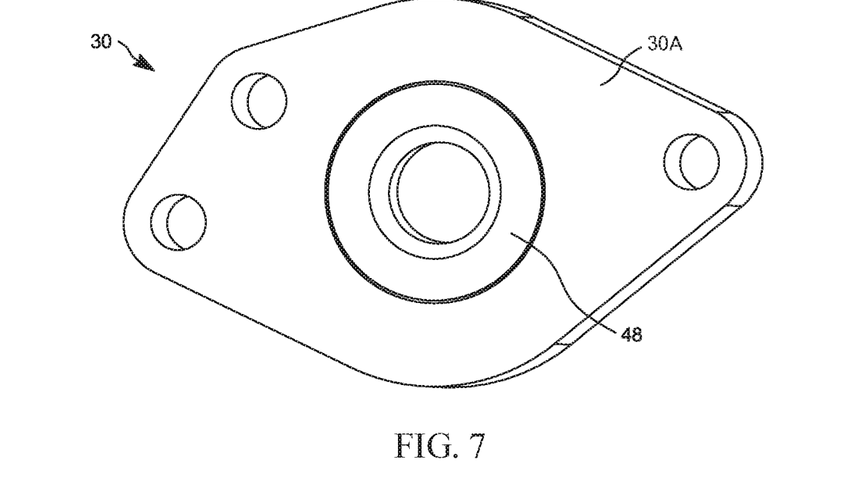
FIG. 7 is a bottom view of the flange of FIG. 5 with a gasket disposed therealong.
Figure 8:
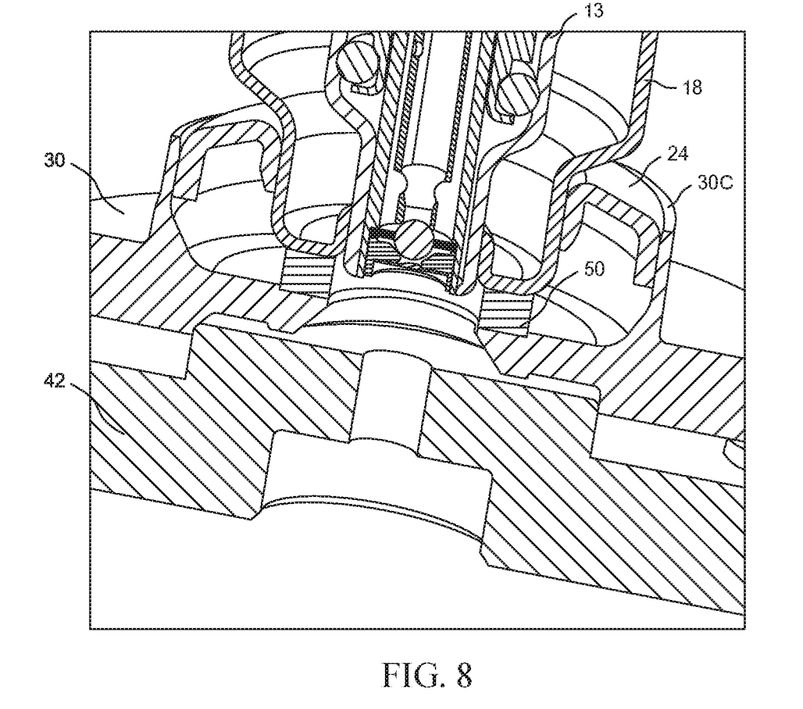
FIG. 8 is an expanded cross-sectional view of a portion of the RDU and exhaust boss of FIGS. 1-4.

Flange 30 is illustrated in FIGS. 5-7, with FIGS. 5 and 6 showing a top or upstream side of flange 30 and FIG. 7 showing a bottom or downstream side thereof. Flange 30 includes body portion 30A having bores 30B defined therethrough for receiving bolts 12. Flange 30 further includes extension 30C which extends from the upstream surface of body portion 30A. Extension 30C is sized and shaped to receive a downstream (outlet) end of RDU 10 and/or fluid injector 13. As can be seen in FIGS. 5 and 6, extension 30C has a cylindrical shape. Flange 30 includes a central bore defined through body portion 30A. Such central bore of flange 30 provides fluid communication between the outlet of injector 13 and exhaust boss 42. Specifically, the central bore of flange 30 defines the internal surface structure 40 of flange 30 which itself defines flange outlet 28 discussed above. Flange 30 may further include an embossed region 30D surrounding the central bore, which is used for receiving and positioning thermal isolator 50 on body portion 30A. FIG. 6 depicts thermal isolator 50 disposed along the upstream surface of body portion 30A, surrounding the central bore of flange 30. FIG. 7 illustrates the underside (downstream side) of flange 30 having gasket 48 disposed thereunder. FIG. 8 illustrates the interrelationship between RDU 10 (coolant jacket 18, coolant jacket extension 24), flange 30 (extension 30C) and exhaust boss 42.

Figure 4:
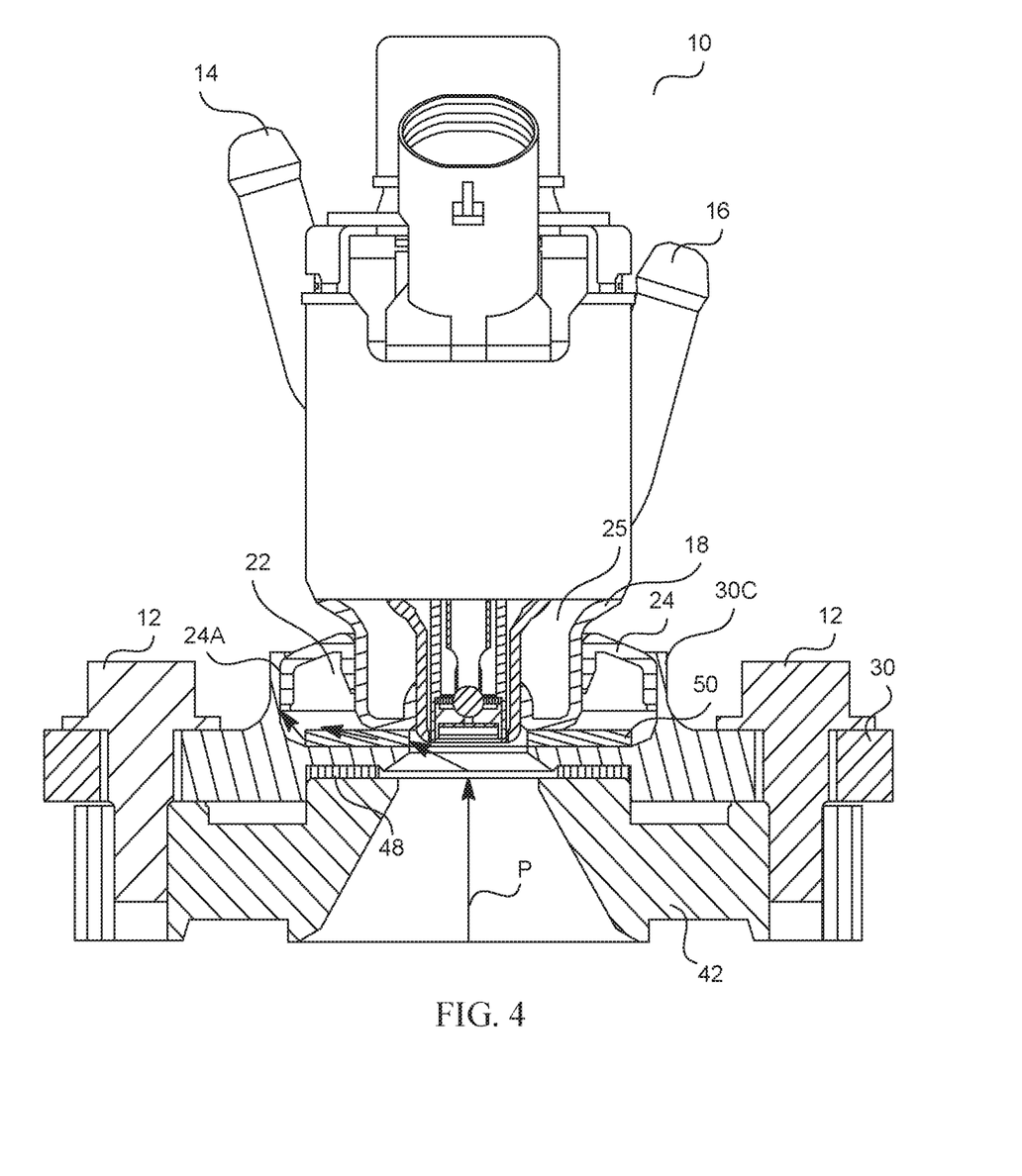
FIG. 4 is another cross-sectional side view of the RDU and exhaust boss of FIG. 1 showing an exhaust gas back-pressure path in relation to the RDU.

Embodiments of the present disclosure include RDU 10 and flange 30 being sealingly connected with each other. Specifically, in a first example embodiment, the inner surface of extension 30C of flange 30 and a radially outer surface 24A of coolant jacket extension 24 of coolant jacket 18 are welded together. See FIG. 3. In an example embodiment, the inner surface of extension 30C and the radially outer surface 24A of coolant jacket extension 24 are laser welded together. Laser welding extension 30C of flange 30 to coolant jacket extension 24 advantageously allows for a sealing connection between flange 30 and RDU 10, which prevents exhaust gas from the engine's exhaust system to escape into a region surrounding RDU 10. FIG. 4 illustrates a potential flow path of exhaust gas from the vehicle/engine exhaust system, passing through exhaust boss 42, flange 30, and thermal isolator 50. However, due to the laser welding connection between flange 30 and coolant jacket extension 24 as described above, the exhaust gas is prevented from passing between extension 30C and coolant jacket extension 24 and into the region surrounding RDU 10. The use of laser welding in this manner advantageously avoids a more complex and costly structure in which thermal isolator 50 is utilized to provide the sealing engagement between flange 30 and the coolant jacket 18 of RDU 10.

Figure 15:
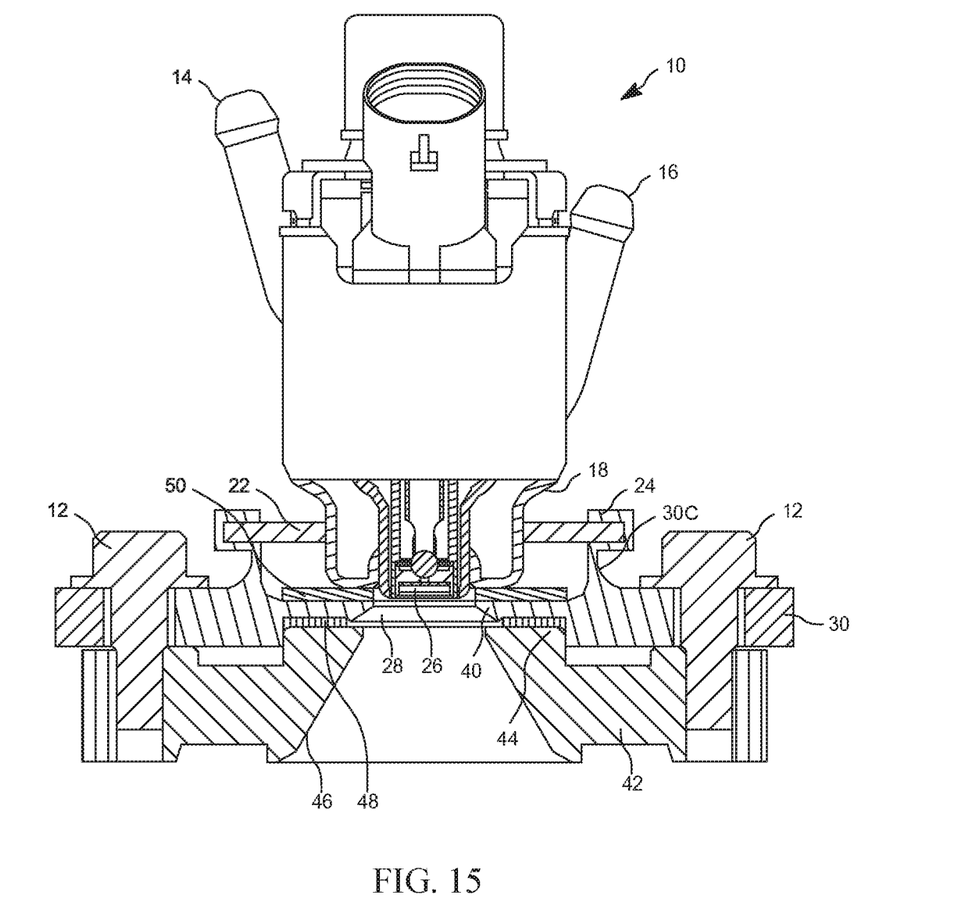
FIG. 15 is a cross sectional view of a side view of the RDU and exhaust boss of FIG. 1 according to another example embodiment.

In another example embodiment, RDU 10 and flange 30 are sealing connected to each other via a brazed connection. A brazed connection between the radially outer surface 24A of coolant jacket extension 24 and the inner surface of extension 30C of flange 30 may also provide a hermetic seal therebetween. In yet another example embodiment, RDU 10 and flange 30 are connected together via a crimped connection. FIG. 15 illustrates a crimped connection between coolant jacket extension 24 and extension 30C of flange 30. Here, coolant jacket extension 24 extends largely radially outwardly from coolant jacket 18 such that a distal end of coolant jacket extension 24 is sandwiched between and crimped with portions of extension 30C of flange 30.

Figure 9:
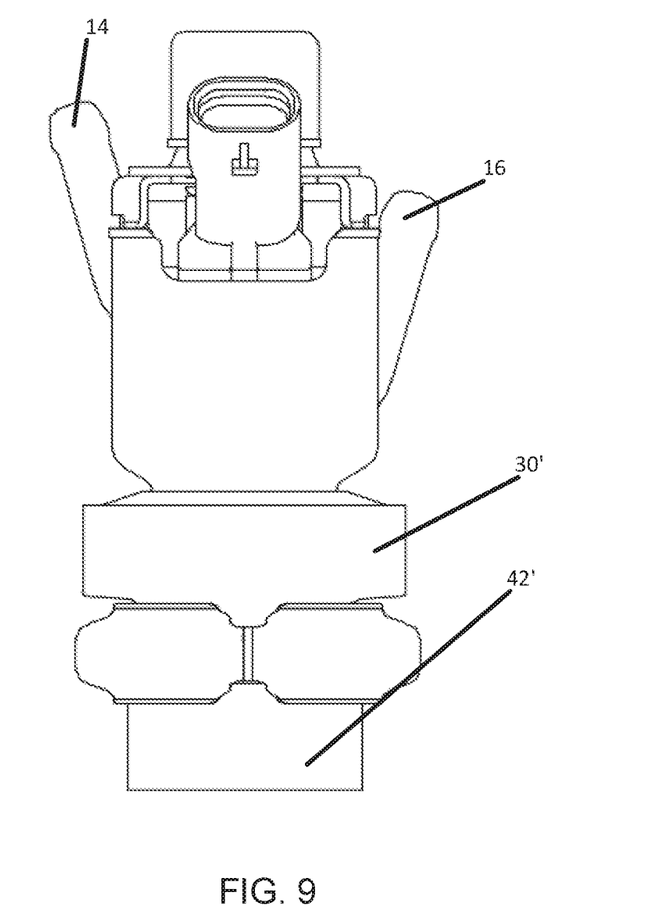
FIGS. 9 and 10 are side views of an RDU coupled to an exhaust boss according to another example embodiment.
Figure 10:
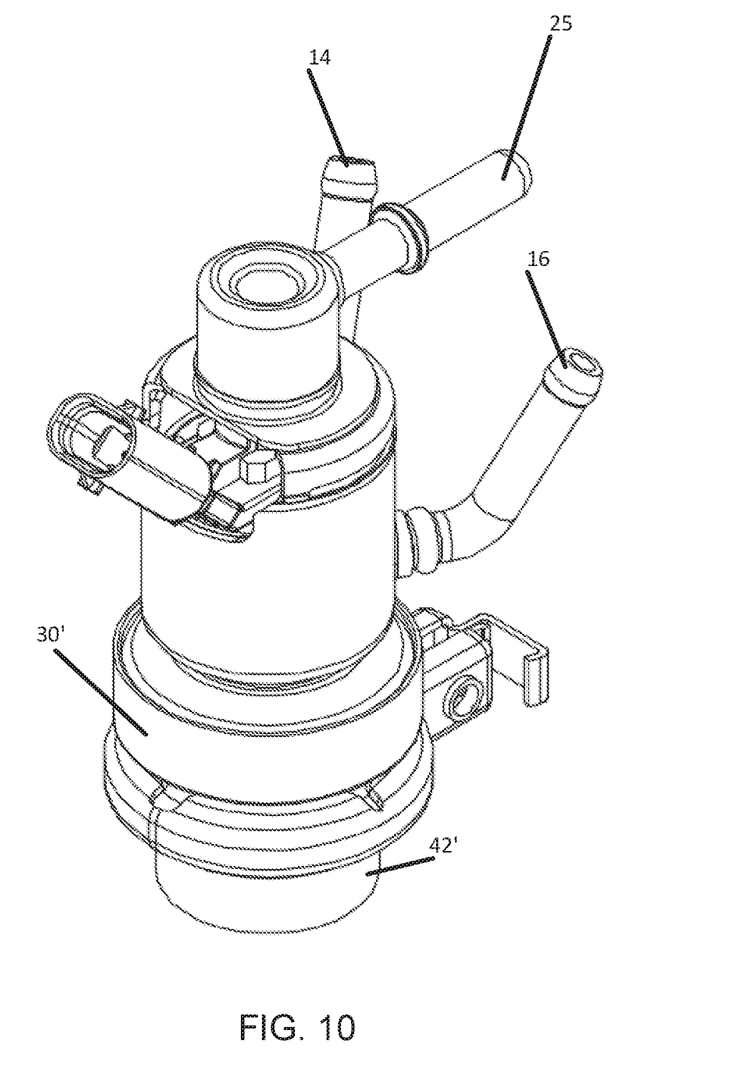
Figure 11:
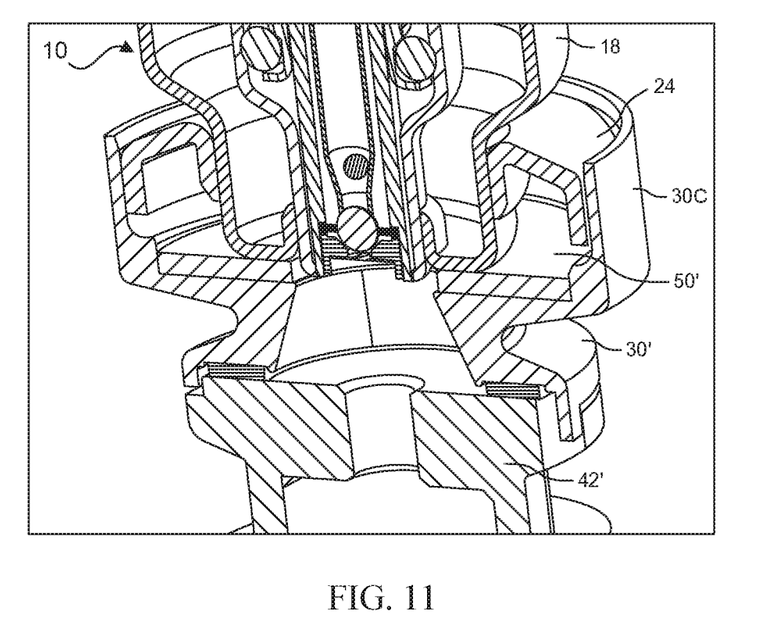
FIG. 11 is an expanded cross-sectional view of a portion of the RDU and exhaust boss of FIGS. 9-10.

FIGS. 9-11 depict RDU 10, flange 30' and exhaust boss 42' according to another example embodiment. Here, flange 30' is a V-clamp flange for mounting RDU 10 to an engine's exhaust system. The isolating V-clamp flange 30' allows for ease of packaging in environments that have limited vertical access to RDU 10. FIG. 11 shows RDU 10, thermal isolator 50', flange 30' and exhaust boss 42'. Thermal isolator 50' is disposed within flange 30' between RDU 10 and/or fluid injector 13 and the central bore of flange 30', surrounds the central bore of flange 30' and extends to the inner surface of extension 30C of flange 30'. As discussed above, thermal isolator 50' is constructed from a thermally resistant material, such as mica. The central bore through flange 30' is defined at least in part by internal surface structure 40 of flange 30'.

Figure 12:
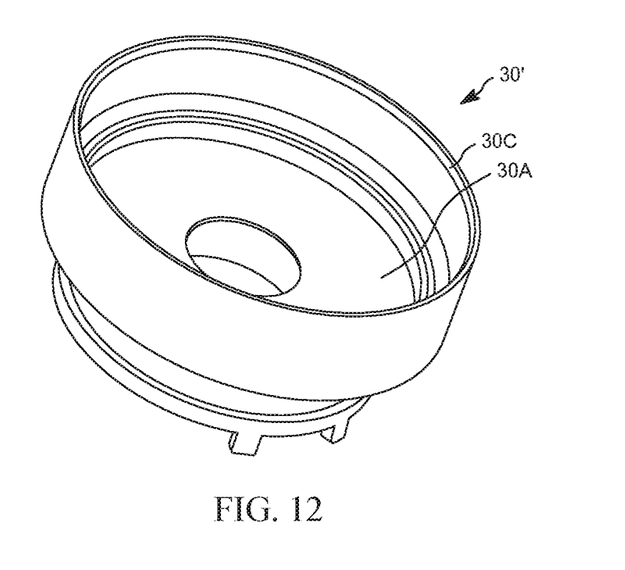
FIG. 12 is a top perspective view of a flange of the RDU of FIGS. 9-10 according to an example embodiment.
Figure 14:
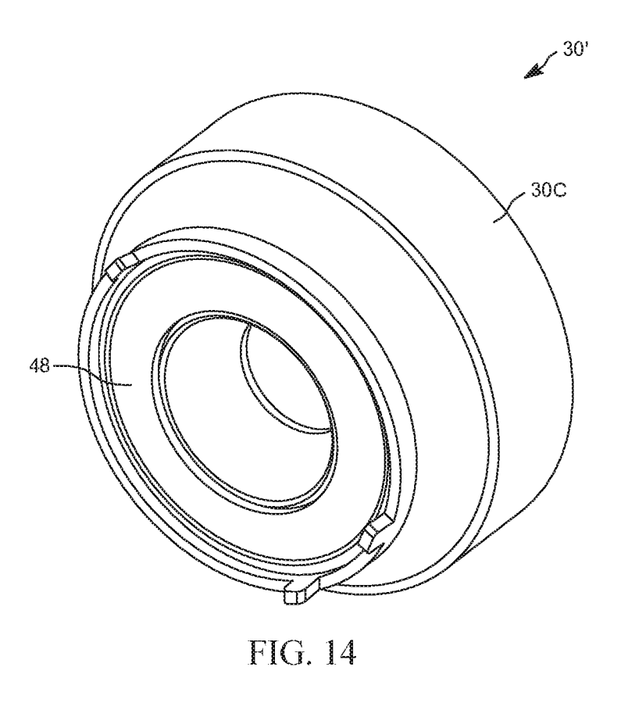
FIG. 14 is a bottom perspective view of the flange of FIG. 12 with a gasket disposed therealong.

FIGS. 12-14 illustrate flange 30'. FIG. 12 shows extension 30C extending from a flat body portion 30A' in an upstream direction (FIG. 11). Similar to flange 30 discussed above with respect to FIGS. 3-7, flange 30' is connected to coolant jacket 18 of RDU 10 via a weld connection. Specifically, the inner surface of extension 30C of flange 30' is laser welded to radially outer surface 24A of coolant jacket extension 24 of RDU 10. Flange 30' being laser welded to RDU 10 in this manner not only provides the structural, mechanical connection to RDU 10 but also prevents exhaust gas from the engine's exhaust system from escaping from the connection between flange 30' and RDU 10.

Figure 13:
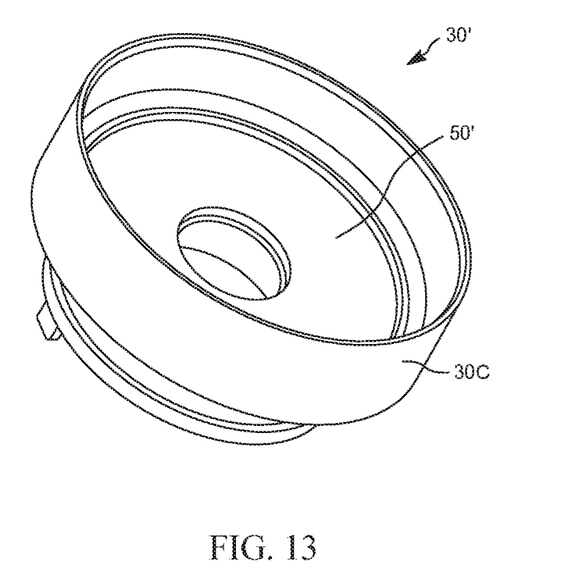
FIG. 13 is a top perspective view of the flange of FIG. 12 with a thermal isolator disposed thereon.

FIG. 13 shows thermal isolator 50' disposed within flange 30'. FIG. 14 shows the underside of flange 30' with gasket 48 disposed downstream of flange 30'. Gasket 48 is disposed between flange 30' and exhaust boss 42' (FIG. 11).

The example embodiments described above show RDU 10 as a liquid cooled RDU. It is understood that RDU 10 may be an air cooled RDU.

Embodiments of the present disclosure use a laser weld to provide a seal behind a mica thermal isolator in order to provide thermal isolation and exhaust gas hermiticity for exhaust after treatment systems. The embodiments use mica only as a support and thermal isolator. The mica is backed up with a hermetic laser weld to provide the hermetic seal. This hermetic laser weld is simple and cost effective compared to trying to configure the mica to perform a sealing function. Advantages of the example embodiments include reliability over lifetime of thermal cycles, cost reduction, packaging improvement, and simplicity over current methods of thermal isolation and exhaust gas sealing.

The cavity 22 formed between the welded flange 30, 30' and RDU 10 may be filled will thermally isolating material instead of air gap as illustrated in the drawings above.

The example embodiments have been described herein in an illustrative manner, and it is to be understood that the terminology which has been used is intended to be in the nature of words of description rather than of limitation. Obviously, many modifications and variations of the invention are possible in light of the above teachings. The description above is merely exemplary in nature and, thus, variations may be made thereto without departing from the spirit and scope of the invention as defined in the appended claims.

What is claimed is:

1. A reductant dosing unit (RDU), comprising:
a fluid injector having a fluid inlet for receiving a reductant and a fluid outlet for discharging the reductant;
a flange disposed proximal to the fluid outlet of the fluid injector and configured to secure to a boss associated with an exhaust path of an internal combustion engine, the flange having a largely flat body portion with a through-bore in fluid communication with the fluid outlet of the fluid injector, and an extension which extends from the body portion toward the fluid injector and which is connected thereto; and
a thermal isolator member disposed between the fluid outlet of the fluid injector and the flange,
wherein the connection between the extension of the flange and the fluid injector comprises a hermetic seal,
wherein the RDU is a liquid cooled RDU, the RDU further comprisng a coolant inlet, a coolant outlet, and a coolant jacket at least partly defining a region that is in fluid communication with the coolant inlet and the coolant outlet,
wherein the coolant jacket includes a coolant jacket extension which extends radially outwardly from the coolant jacket, and wherein a radially outer surface of the coolant jacket extension forms the hermetic seal connection with the extension of the flange.

2. The RDU of claim 1, wherein the hermetic seal connection comprises a laser weld connection.

3. The RDU of claim 1, wherein when the flange is secured to the boss, the hermetic seal connection prevents exhaust gas from the exhaust path from passing between the flange and the fluid injector.

4. The RDU of claim 1, wherein the thermal isolator member is constructed from mica.

5. The RDU of claim 1, wherein the thermal isolator member has an annular shape and surrounds an upstream opening of the through-bore of the flange, relative to a direction of reductant flow through the RDU.

6. The RDU of claim 5, wherein the thermal isolator radially extends to an inner surface of the extension of the flange.

7. The RDU of claim 5, wherein the thermal isolator extends radially outwardly so as to be spaced from an inner surface of the extension of the flange.

8. The RDU of claim 1, wherein the hermetic seal connection comprises a crimped connection between the coolant jacket extension and the extension of the flange.

9. A dosing unit, comprising:
 a fluid injector having a fluid inlet for receiving a reductant and a fluid outlet for discharging the reductant;
 a flange disposed proximal to the fluid outlet of the fluid injector and configured to secure to a boss associated with an exhaust path of an internal combustion engine, the flange having a largely flat body portion with a through-bore in fluid communication with the fluid outlet of the fluid injector, and an extension which extends from the body portion toward the fluid injector and which is connected thereto; and
 a thermal isolator member disposed between the fluid outlet of the fluid injector and the flange,
 wherein the connection between the extension of the flange and the fluid injector comprises a laser weld connection, the laser weld connection preventing exhaust gases from the exhaust path from passing between the flange and the fluid injector when the flange is secured to the boss,
 wherein the dosing unit is a liquid cooled dosing unit, the dosing unit further comprising a coolant inlet, a coolant outlet, and a coolant jacket at least partly defining a region that is in fluid communication with the coolant inlet and the coolant outlet,
 wherein the coolant jacket includes a coolant jacket extension which extends radially outwardly from the coolant jacket, wherein a radially outer surface of the coolant jacket extension forms the laser weld connection with the extension of the flange.

10. The dosing unit of claim 9, wherein the thermal isolator member comprises mica.

11. The dosing unit of claim 9, wherein the thermal isolator member has an annular shape and surrounds an upstream opening of the through-bore of the flange, relative to a direction of reductant flow through the dosing unit.

12. The dosing unit of claim 11, wherein the thermal isolator radially extends to an inner surface of the extension of the flange.

13. The dosing unit of claim 11, wherein the thermal isolator extends radially outwardly and is spaced from an inner surface of the extension of the flange.

14. The RDU of claim 1, wherein the coolant jacket extension has a substantially inverted U-shaped cross-section.

15. The RDU of claim 14, wherein the coolant jacket extension includes a first portion which is disposed along an outer surface of the coolant jacket, a second portion which extends from the first portion in a largely radial direction, and a third portion which extends from the second portion in a largely axial direction, and wherein an outer surface of the third portion is welded to an inner surface of the extension of the flange.

16. The RDU of claim 15, wherein the coolant jacket, the coolant jacket extension, the thermal isolator member and the flange form a cavity disposed radially outwardly from the coolant jacket.

17. The dosing unit of claim 9, wherein the coolant jacket extension includes a first portion which is disposed along an outer surface of the coolant jacket, a second portion which extends from the first portion in a largely radial direction, and a third portion which extends from the second portion in a largely axial direction, and wherein an outer surface of the third portion is welded to an inner surface of the extension of the flange.

18. The dosing unit of claim 17, wherein the coolant jacket, the coolant jacket extension, the thermal isolator member and the flange form a cavity disposed radially outwardly from the coolant jacket.

19. The dosing unit of claim 9, wherein the coolant jacket extension has a substantially inverted U-shaped cross-section.

* * * * *